United States Patent [19]

Greene

[11] 3,950,740
[45] Apr. 13, 1976

[54] SUMP WATER DETECTOR WITH ISOLATED PROBE HAVING AC APPLIED TO ITS ELECTRODES

[75] Inventor: Leonard M. Greene, Chappaqua, N.Y.

[73] Assignee: Safe Flight Instrument Corporation, White Plains, N.Y.

[22] Filed: Feb. 4, 1974

[21] Appl. No.: 439,260

[52] U.S. Cl............. 340/244 C; 340/235; 340/236; 200/61.05; 324/65 R
[51] Int. Cl.²....................................... G08B 21/00
[58] Field of Search .......... 340/244, 235, 236, 270; 200/61.05; 324/65 R

[56] References Cited
UNITED STATES PATENTS

| | | | |
|---|---|---|---|
| 2,295,927 | 9/1942 | Botteron | 340/235 |
| 3,170,479 | 2/1965 | Mueller | 340/244 C X |
| 3,242,473 | 3/1966 | Shivers, Jr. et al. | 340/235 X |
| 3,335,334 | 8/1967 | Albisser | 340/244 C X |
| 3,374,476 | 3/1968 | Koebel et al. | 340/235 |
| 3,493,950 | 2/1970 | Lind | 340/244 C X |
| 3,755,801 | 8/1973 | Milo | 340/244 R |

*Primary Examiner*—John W. Caldwell
*Assistant Examiner*—Daniel Myer
*Attorney, Agent, or Firm*—Kirschstein, Kirschstein, Ottinger & Frank

[57] ABSTRACT

A system for detecting the presence of water in an aircraft fuel sump with the aid of a pair of electrodes to which a detector circuit is connected. When both electrodes touch water in the sump below the fuel the detector circuit energizes a warning signal. The electrodes are connected to the opposite ends of a winding of a transformer having another winding which forms a leg of a voltage divider. The other leg of the voltage divider constitutes a resistor. The voltage divider is energized by an AC source of electrical energy whereby AC energy is applied to the electrodes. A signal taken from across the resistor is applied to an operational amplifier the output of which is adapted to trigger a solid state switch having an output connected to an electrically activatable warning device. When the electrodes are both in water the resistance between them becomes low so that the impedance of the second winding of the transformer becomes low and the signal appearing across the resistor becomes high, thereby causing the operational amplifier to trigger the solid state switch and energize the electrically activatable warning device.

4 Claims, 5 Drawing Figures

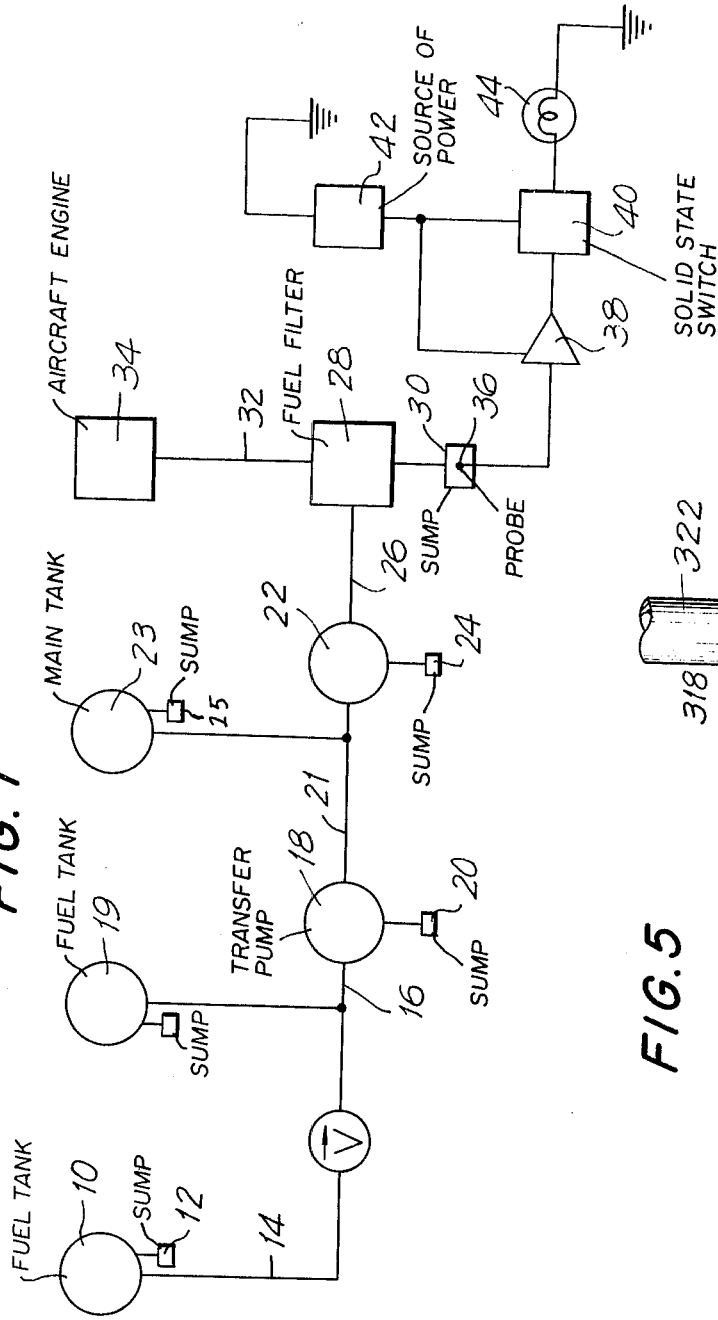
FIG. I
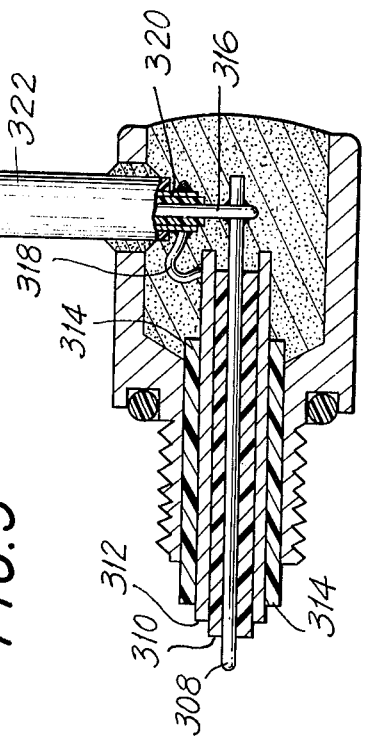
FIG. 5

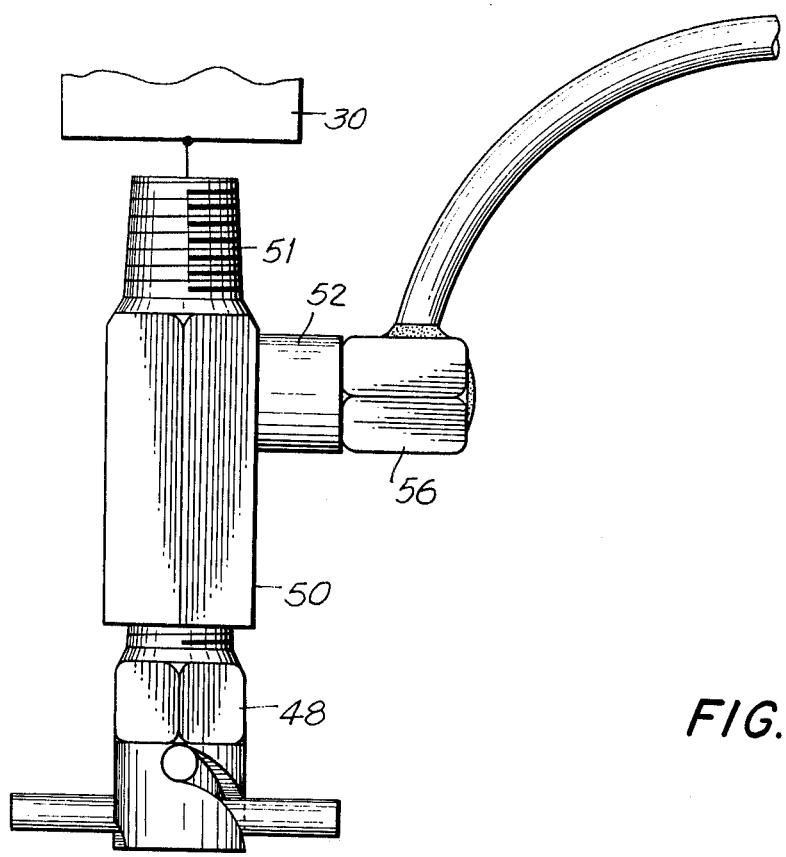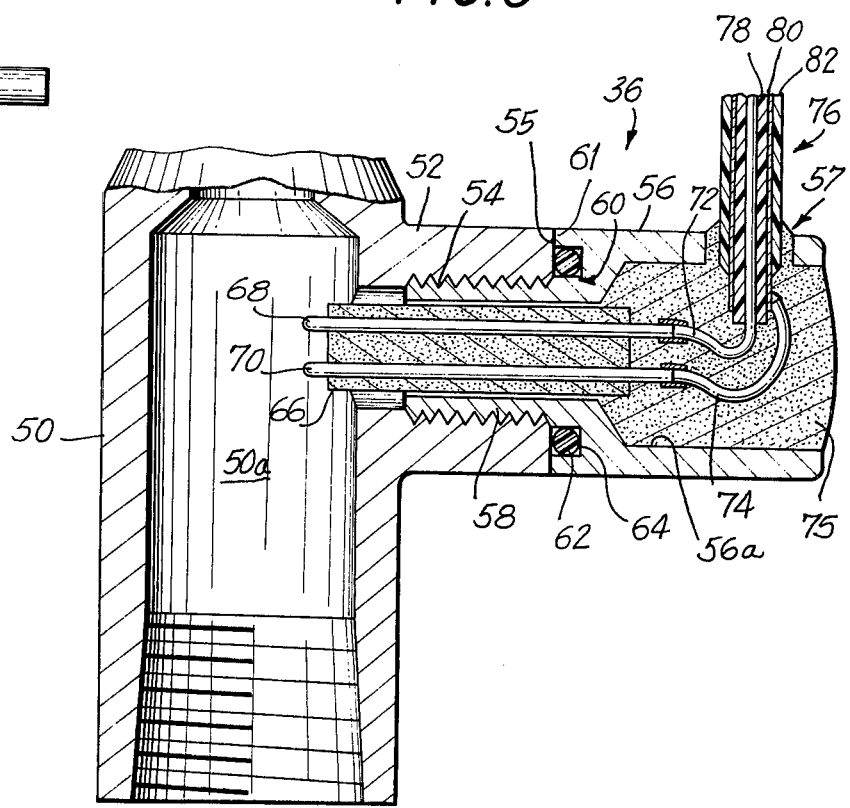

SUMP WATER DETECTOR WITH ISOLATED PROBE HAVING AC APPLIED TO ITS ELECTRODES

BACKGROUND OF THE INVENTION

1. Field of the Invention

A system for detecting the presence of water in an aircraft fuel sump.

2. Description of the Prior Art

As is well known, it is extremely important to make certain that aircraft engines have a continuous supply of fuel free from water. An extremely hazardous situation exists if water accumulates anywhere in the fuel system and freezes to block the flow of fuel.

Sumps are provided at all places on an aircraft where fuel exists from tanks, filters, etc. and at other places where water might collect. Water, which is heavier than fuel, may be entrained in the fuel which is supplied to the aircraft tanks. It also may condense from the air that enters the aircraft tanks as the fuel therein is consumed. Since it is essentially impossible to stop water from entering an aircraft fuel system, it is necessary to remove the water from the fuel system to the maximum extent possible. The presence of water in the fuel system manifests itself most noticeably during engine warmup and taxiing when severe vibrations dislodge droplets of water clinging to metal surfaces in the fuel system and cause water droplets floating on fuel in the tanks to sink. If water collects during taxiing it is desirable for the pilot to know this so that a proper assessment can be made of the situation prior to takeoff and appropriate corrective action taken.

Flight regulations require that the sumps on an aircraft be drained prior to each flight. However, since the sumps drain outside the aircraft it is sometimes difficult for maintenance personnel to determine whether water or fuel is being drained. This is particularly true in wet or windy weather. It is, of course, desirable for a pilot to know after the sumps are drained that all the water has actually been drained so that if further draining is required this can be done prior to flight.

SUMMARY OF THE INVENTION

Purposes of the Invention

It is an object of the present invention to provide means for detecting the presence of more than a preselected amount of water in an aircraft sump and for providing a warning signal indicative of the presence of such water.

Other objects in part will be obvious and in part will be pointed out hereinafter.

Brief Description of the Invention

According to the present invention, the foregoing as well as other objects are achieved by positioning an electric resistance sensing probe in an aircraft sump. The term "sump" includes any space below a fuel handling line or device.

A detector circuit connected to the probe controls a warning device. When the probe contacts water in the sump the detector circuit activates the warning device so that the aircraft pilot is made aware of the fact that more than a predetermined amount of water is present in the sump. When the probe contacts fuel the detector circuit does not activate the warning device.

The invention accordingly consists in the features of construction, combination of elements and arrangement of parts which will be exemplified in the system hereinafter described and of which the scope of application will be indicated in the appended claims.

BRIEF DESCRIPTION OF THE DRAWINGS

In the drawings, wherein like parts in the different FIGS. are identified by the same reference numeral:

FIG. 1 is a schematic illustration of an aircraft fuel system using the present invention;

FIG. 2 illustrates an adaptor and probe arrangement according to the present invention;

FIG. 3 is a sectional view of the adaptor and probe of FIG. 2;

FIG. 5 is a sectional view showing an alternate probe that can be used in the present invention.

DESCRIPTION OF THE PREFERRED EMBODIMENTS

Figure 4:
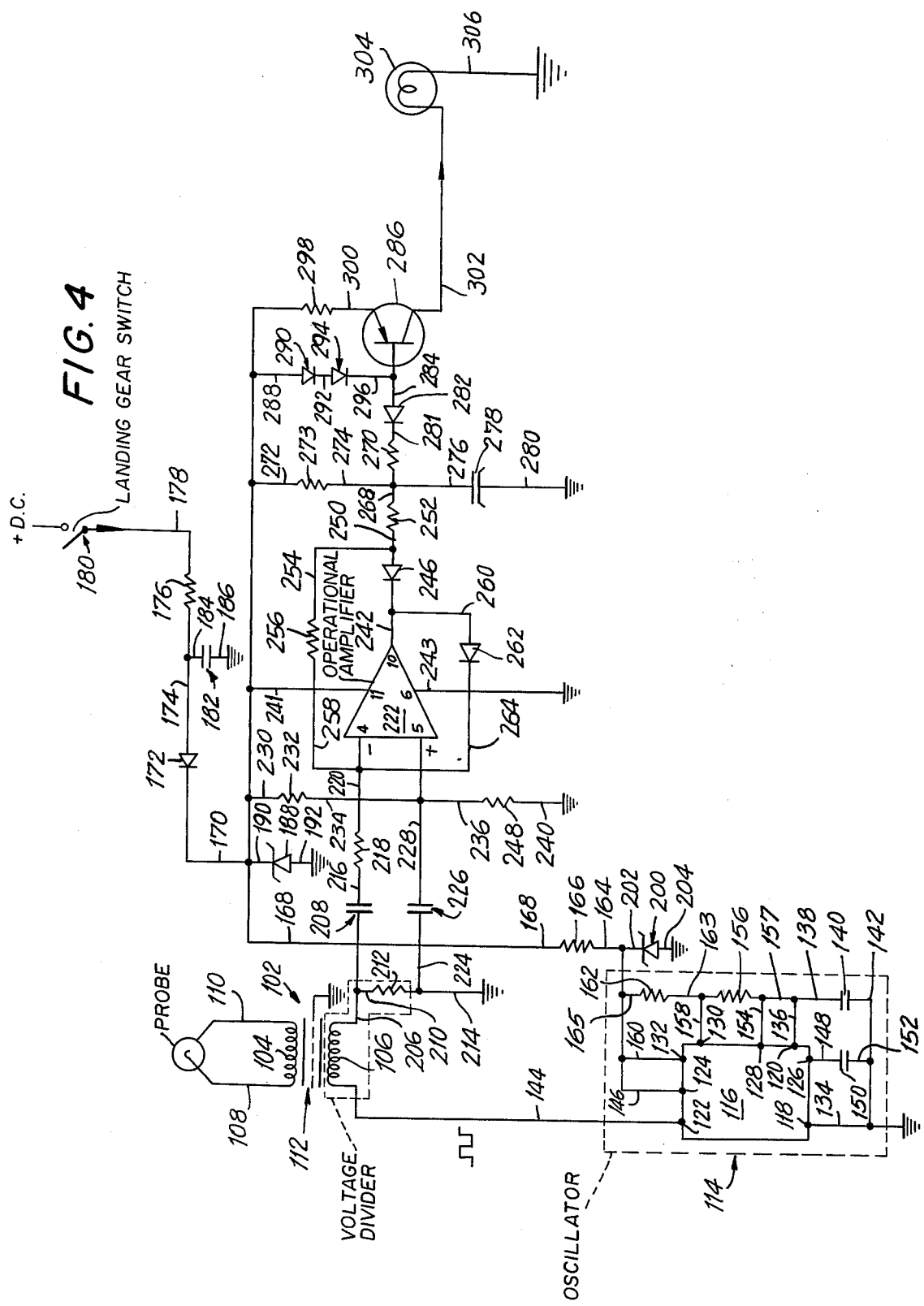
FIG. 4 is a circuit diagram of a detector circuit used in the present invention.

In FIG. 1 of the drawings a fuel tank 10 is shown. A sump 12 is connected to the bottom of fuel tank 10 and is below said fuel tank. A conduit 14 connects fuel tank 10 to conduit 16 which leads to a transfer pump 18. Other fuel tanks exemplified by the tank 19 usually are provided, each having a sump. A sump 20 is connected to the bottom of transfer pump 18 and is below said transfer pump. Conduit 21 is connected to a boost pump 22 and to main tank 23. A sump 24 is connected to the bottom of boost pump 22. A sump 25 is similarly provided for main tank 23. A conduit 26 connects boost pump 22 to fuel filter 28. A sump 30 is connected to the bottom of fuel filter 28 and is below said filter. A conduit 32 connects fuel filter 28 to an aircraft engine 34. A probe 36 is so positioned as to contact the liquid at the bottom of sump 30 at any desired level above the bottom of the sump. Similar probes may be employed in conjunction with one or more additional ones of the sumps. The probe (or probes) is connected to an amplifier 38 which in turn is connected to a solid state switch 40. A source of power 42 is provided for amplifier 38 and solid state switch 40. An indicator light 44 is connected to the output of solid state switch 40.

When the probe (or probes) contacts fuel, indicator light 44 is idle. However, when probe (or probes) 36 contacts water, indicator light 44 is energized advising the pilot of the presence of water in one or more sumps in the aircraft fuel system. The pilot can then take whatever action he deems appropriate to rectify the situation.

In FIG. 2 of the drawings an exemplificative adaptor 50 is shown which is so positioned that its electrical resistance sensing means is in contact with the liquid in the sump. Adaptor 50 is connected to the bottom of and thereby becomes a part of the sump 30. Said adaptor includes a threaded nipple 51 which is screwed into a tapped opening in the bottom of sump 30. A standard drain valve 48 is positioned below adaptor 50 and includes a male threaded end which is screwed into the internally threaded bottom of adaptor 50.

Adaptor 50 (see FIG. 3) includes a hollow vertical interior 50a and a hollow horizontal stub 52. Stub 52 has internal threads 54 and a flat end face 55. Probe 36 includes a probe housing 56. A lateral opening 57 provides communication with the interior of housing 56. Housing 56 has an externally threaded plug 58 the threads of which are in threaded engagement with internal threads 54. Housing 56 includes a shoulder 60 having a face 61 which edge abuts flat face 55 of stub 52. An O-ring 62 is an annular groove 64 bears against flat face 55 of stub 52 to provide a liquid-tight seal.

A stationary cylindrical liquid-tight seal 66 extends through the interior of housing 56 and, specifically, through the portion about which the external threads are located and into interior 50a of adaptor 50. Seal 66 has a very high electrical resistance and is preferably made from a fuel-inert plastic or glass. Extending through seal 66 and past the ends thereof is a pair of spaced-apart parallel electrodes 68 and 70, respectively, which electrodes may be made of platinum. The forward tips of electrodes 68 and 70 extend into interior 50a of adaptor 50 while the rear portions of the electrodes are in the interior 56a of housing 56 to the right of plug 58 as viewed in FIG. 3. The rear portion of electrode 68 is electrically connected to a wire 72 while the rear portion of electrode 70 is electrically connected to a wire 74. The intermediate portions of the electrodes 68 and 70 are imbedded in seal 66 to prevent them from moving relative to each other and for electrically insulating said electrodes from each other. Another seal 75 fills the interior of probe housing 56 so that the wires which are attached to the respective electrodes are electrically insulated from each other. A suitable material for seal 75 is a room temperature-vulcanizable rubber compound. Of course, as will be apparent to those skilled in the art, other materials could similarly be used.

A coaxial cable 76 extends into interior 56a through opening 57. Wire 72 is the central conductor of said coaxial cable. Wire 72 is surrounded by an insulating sheath 78 and surrounding insulating sheath 78 is an electrically conducting sheath 80. Wire 74 is connected to conducting sheath 80. An insulating sleeve 82 surrounds conducting sheath 80.

The probe and adaptor housing can be made from stainless steel or brass.

A detector circuit connected by the coaxial cable to the probe is responsive to the resistance of the liquid across the electrodes, generating an output when the resistance is low, e.g. in the order of thousands of ohms and having no output when the resistance is high, e.g. in the order of megohms.

A suitable such detector circuit is shown in FIG. 4. It includes a transformer 102 with windings 104 and 106. Conductors 108 and 110 connect opposite ends of winding 104 to wire 72 and conducting sheath 80 respectively. In actual use, a socket will be provided into which a jack can be inserted, said jack being connected to wire 72 and conducting sheath 80 so that wire 72 is in circuit with conductor 108 and conducting sheath 80 in circuit with conductor 110. A core with a grounded electrostatic shield 112 is associated with windings 104 and 106. Electrostatic shield 112 protects against electrostatic transients.

A free-running oscillator (multivibrator) 114 shown within dotted lines is provided which includes an integrated circuit 116 manufactured by Signetics of Sunnyvale, California and identified by No. NE555. Integrated circuit 116 includes terminals 118, 120, 122, 124, 126, 128, 130 and 132. Terminal 118 is a grounded terminal and is connected by conductor 134 to ground. Terminal 120 is a trigger terminal and is connected by conductor 136 to conductor 138. Conductor 138 is connected to capacitor 140 and conductor 142 connects capacitor 140 to conductor 134 and ground. Terminal 122 is an output terminal and is connected by conductor 144 to one end of winding 106. The output of integrated circuit 116 is a square wave shown in FIG. 4 adjacent conductor 144. Terminal 124 is a reset terminal and is connected to conductor 146. Terminal 126 is a control voltage terminal which is connected to conductor 148 which in turn is connected to capacitor 150. A conductor 152 connects capacitor 150 to conductor 142 and to ground. Terminal 128 is a threshold terminal and is connected by conductor 154 to one end of resistor 156. Conductor 157 connects the other end of resistor 156 to conductors 136 and 138. Terminal 130 is a discharge terminal and is connected by conductor 158 to the other end of resistor 156. Terminal 132 is the Vcc terminal and is connected by conductor 160 to conductor 146. A resistor 162 is connected by conductor 163 to the junction of conductor 158 and resistor 156 and by conductor 165 to conductor 146.

Capacitor 150 is a stabilizing filter for threshold voltage. Resistors 156, 162 and capacitor 140 are for frequency control. The values of capacitor 140 and resistor 156 are selected to provide an output frequency in the order of 2,000 cycles. This is not critical. Typically a frequency of 300 cycles to 30 kilocycles is employed. Resistor 162 is a voltage dropping resistor.

Conductor 146 is connected to conductor 164 which is connected to one end of voltage dropping resistor 166 for the oscillator. DC bus conductor 168 connects the other end of resistor 166 to conductor 170 which is connected to the cathode of diode 172. The anode of diode 172 is connected by conductor 174 to one end of resistor 176 the other end of which is connected to conductor 178 which is connected to a power input that is a positive DC voltage of either 14 or 28 volts. A landing gear switch 180 interposed on conductor 178 prevents electrical power from being applied to resistor 176 when the aircraft is in the air. A capacitor 182 is connected by conductor 184 to conductor 174 and by conductor 186 to ground. Capacitor 182 and resistor 176 perform a filtering and voltage dropping function. Diode 172 prevents reverse flow.

A Zener diode 188 has its cathode connected by conductor 190 to conductor 168 and conductor 170. A conductor 192 connects the anode of Zener diode 188 to ground. Zener diode 188 protects the circuit components against overvoltage transients.

A Zener diode 200 has its cathode connected by conductor 202 to conductors 146 and 164. Conductor 204 connects the anode of Zener diode 200 to ground. Zener diode 200 in conjunction with resistor 166 provides voltage regulation for oscillator 114.

A conductor 206 is connected to the remaining end of winding 106 and to coupling capacitor 208. A conductor 210 connects conductor 206 to one end of resistor 212 and a conductor 214 connects the other end of resistor 212 to ground. Resistor 212 is a load resistor and with winding 106 forms a voltage divider. A conductor 216 connects capacitor 208 to one end of input resistor 218. Conductor 220 connects the other end of resistor 218 to one input terminal of an operational amplifier 222.

A conductor 224 connects conductor 214 to coupling capacitor 226 and a conductor 228 connects capacitor 226 to another input terminal of amplifier 222. A conductor 230 connects DC bus conductor 168 through resistor 232 and conductor 234 to conductor 228. A conductor 236 connects conductor 234 through resistor 238 and a conductor 240 to ground. Resistors 232 and 238 perform a voltage dividing function and set a DC reference level for amplifier 222 at conductor 228. A conductor 241 connects DC bus conductor 168 to a terminal of amplifier 222 and a conductor 243 connects another terminal of the amplifier to ground. The output of amplifier 222 is connected by conductor 242 to diode 246, and, specifically, the cathode of said diode. A conductor 250 connects the anode of diode 246 to one end of a resistor 252. Diode 246 rectifies the output of amplifier 222 so that a one half wave DC output is obtained.

A conductor 254 connects conductor 250 through feedback resistor 256 and a conductor 258 to conductor 220. The ratio of resistors 218 and 256 determines the gain of the amplifier circuit. A conductor 260 connects conductor 242 to the anode of diode 262, said diode being a clamping diode. A conductor 264 connects the cathode of diode 260 to conductor 220.

A conductor 268 connects the other end of resistor 252 to one end of a resistor 270. A conductor 272 connects DC bus conductor 168 through resistor 273 and a conductor 274 to conductor 268. A conductor 276 connects conductor 268 through capacitor 278 and a conductor 280 to ground. Resistor 252 and capacitor 278 filter and smooth the pulsating amplifier half wave output.

A conductor 281 connects the other end of resistor 270 to the cathode of diode 282. A conductor 284 connects the anode of diode 282 to the base of transistor 286. A conductor 288 connects conductor 168 to the anode of diode 290 and a conductor 292 connects the cathode of diode 290 to the anode of diode 294. A conductor 296 connects the cathode of diode 294 to conductor 284. Diode 282 provides a bias to establish a threshold for transistor 286. Resistor 270 limits the base current to said transistor. DC bus conductor 168 is connected through resistor 298 and a conductor 300 to the emitter of transistor 286. A conductor 302 connects the collector of transistor 286 to one terminal of an indicator light 304 and a conductor 306 grounds the other terminal of said indicator light. Diodes 290 and 294, together with resistor 298, serve a current limiting function to prevent burn out of transistor 286.

The ratings for the circuit components are set forth below:

Resistor 212, 2,200 ohms
Resistor 162, 1,000 ohms
Resistor 156, 33,000 ohms
Resistor 166, 1,000 ohms
Resistor 218, 1,000 ohms
Resistor 256, 100,000 ohms
Resistor 252, 1,500 ohms
Resistor 273, 280,000 ohms
Resistor 270, 10,000 ohms
Resistor 176, 7 ohms
Resistor 298, 5.6 ohms
Resistor 238, 43,000 ohms
Resistor 232, 43,000 ohms
Zener diode 200, 6.2 volts Diodes 172, 262, 246, 282, 290 and 294 are 1N645 crystal diodes.

Zener diode 188 is a TRANSZORB 1.5KE36A Zener diode manufactured by General Semiconductors Industries, Inc. of Tempe, Arizona.
Capacitor 150, 0.01 microfarad
Capacitor 140, 0.01 microfarad
Capacitor 226, 1 microfarad
Capacitor 208, 1 microfarad
Capacitor 278, 10 microfarads
Capacitor 182, 0.01 microfarad Transistor 286 is a TIP32A transistor.
Operational amplifier 222 is a $\mu$741C made by Signetics of Sunnyvale, California.

Before discussing how the circuit of FIG. 2 operates as a part of the present invention, it is to be noted that the water present in association with aircraft fuel has a substantially lower resistance than the resistance of aircraft fuel.

When there is no water in the fuel sump of which adaptor 50 forms a part the tips of both electrodes 68 and 70 contact fuel and the resistance between said tips will be in the order of millions of ohms. As a result, transformer winding 106 will have an impedance so high that the gain of amplifier 222 will not be sufficient to turn on transistor 286. Consequently, indicator light 304 will not be energized. If the tips of both electrodes 68 and 70 contact water in the adaptor, the resistance between the tips will be significantly lower than when both tips of the electrodes contact fuel. As an example, when both electrode tips contact water the resistance between the tips is in the order of thousands of ohms, e.g. in the range of from 3,000 to 30,000 ohms. As a consequence, transformer winding 106 will have an impedance low enough so that the output of amplifier 222 will be sufficient to cause transistor 286 to conduct resulting in energization of indicator light 304. The pilot will then be alerted to the fact that there is water in a sump (any one or more of the several being thus observed) and can take whatever action he deems appropriate. It is to be appreciated that indicator light 304 will be energized only as long as both electrode tips contact water below the fuel.

The present invention continuously monitors the sump water situation while the aircraft is on the ground. It is simple to install and requires no adjustment or maintenance.

As a result of using the present invention the problem of having water in the fuel system is minimized.

By using an alternating current electrolytic corrosion of the electrodes is minimized. In addition, there is no conducting gel created at the electrodes. The open circuit voltage at the probe is low (less than two volts) which helps with respect to corrosion, polarization and other electromechanical action. Still further, the use of alternating current allows an isolation transformer to be utilized.

A further advantage of the present invention is that there is no direct electrical circuit between the probe and the aircraft power system.

It is to be appreciated that other circuits can be utilized with a sump probe for providing a signal indicating when the electrode tips contact water before the fuel in the sump. If desired, an audio signal device may be substituted for the indicator light.

In FIG. 5 of the drawings an alternate probe structure is illustrated which differs from the probe structure hereinbefore disclosed. The probe structure of FIG. 5 includes an electrode 308 the forward tip of which can be placed in interior 50a of adaptor 50. Surrounding electrode 308 is an insulating sheath 310 and surrounding insulating sheath 310 is a circular electrode 312 the forward tip of which can be placed in interior 50a of adaptor 50. Surrounding circular electrode 312 is an insulating sheath 314 which is wedged against the interior of the section of probe housing 56 that is externally threaded.

Electrode 308 is connected to conductor 316 and electrode 312 is connected by conductor 318 to conducting sheath 320. Conducting sheath 320 and conductor 316 are part of coaxial cable 322.

The probe described in FIG. 5 is utilized in the same manner as the probe hereinbefore described.

As various possible embodiments might be made of the above invention, and as various changes might be made in the embodiments above set forth, it is to be understood that all matter herein described or shown in the accompanying drawings is to be interpreted as illustrative and not in a limiting sense.

Having thus described the invention there is claimed as new and desired to be secured by Letters Patent:

1. A system for detecting the presence of water in aircraft fuel comprising a probe having two electrodes, reservoir means in fluid communication with a portion of an aircraft fuel system, said reservoir means positioned below said portion, means locating said probe so that said two electrodes are exposed in said reservoir means, an electrically activatable warning device, a DC source of power, an electronic inverter including output terminals and having an output between 300 to 30,000 Hz., a transformer having two windings, a load resistor, means connecting one of said output terminals of said electronic inverter to ground, means connecting the other of said output terminals through one of said windings of said transformer and said load resistor to ground, said other of said transformer windings having two ends, means connecting said ends of said other transformer winding respectively to said electrodes of said probe, and means connecting said warning device across said load resistor so as to activate said warning device when the resistance between said electrodes drops upon both electrodes contacting water, said load resistor being of sufficient value to limit current flow through said other of said transformer windings to prevent accidental ignition of fuel within said fuel system.

2. A system according to claim 1 wherein said reservoir means includes an adaptor positioned between an aircraft fuel sump and a drain valve below the aircraft sump, said adaptor being in fluid communication with the aircraft sump and drain valve, said electrical sensing means being exposed to the interior of said adaptor.

3. A system according to claim 1 wherein said warning device is a light.

4. A system according to claim 1 wherein there is interposed between said electrically activatable warning device and said load resistor an operational amplifier and a solid state switch controlled by the output of said amplifier, said amplifier and said solid state switch being powered by said DC power source.

* * * * *